Feb. 9, 1926.    1,572,431
H. HANSEN
HOLLOW DIBBLE
Filed April 25, 1922
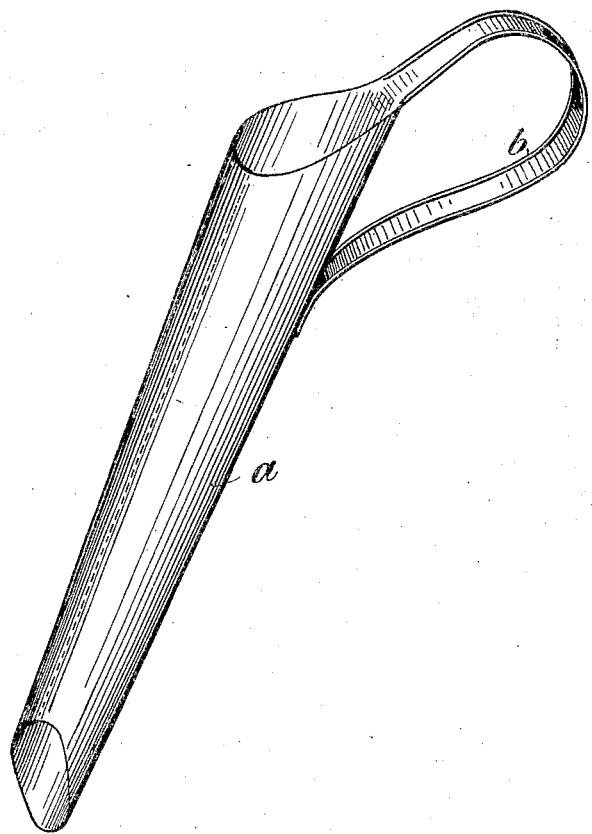
Inventor
Holger Hansen
by his Attorneys
Langner, Parry, Card & Langner.

Patented Feb. 9, 1926.

1,572,431

UNITED STATES PATENT OFFICE.

HOLGER HANSEN, OF CHARLOTTENLUND, NEAR COPENHAGEN, DENMARK.

HOLLOW DIBBLE.

Application filed April 25, 1922. Serial No. 556,515.

*To all whom it may concern:*

Be it known that I, HOLGER HANSEN, residing at Charlottenlund, near Copenhagen, Denmark, have invented certain new and useful Improvements in Hollow Dibbles, of which the following is a specification.

When holes for small plants, onions, etc., are made with a common dibble it is a great inconvenience that the sides and bottom of the hole are pressed hard, because the hole is produced simply by the dibble displacing a certain volume of earth. Furthermore the hole tapers to a point at the bottom.

It is difficult for the root fibres to penetrate through the hard sides and bottom of the hole.

In order to avoid said inconvenience semi-cylindrical planting spoons are often used, with which a hole is dug out, but this leads to the inconvenience that several thrusts must be made and the loosened earth be removed before the hole is ready.

According to the invention these inconveniences are avoided, a planting hole the sides and bottom of which are not pressed hard being made by one thrust, whereby the bottom of the hole is broad The drawing shows a constructional form of the device.

The device consists of a conical tube $a$ of metal or other suitable material, open at both ends. At one end—the narrow end in case of a conical tube—the tube is cut by a cut not perpendicular to the axis of the tube. The other end of the latter is provided with a handle $b$.

When a hole is dibbled the earth filling out the interior of the tube by its insertion is taken up with the tube so that by one single thrust a hole is produced whose bottom and sides are easily permeable to the root fibres.

The details of the device may be altered without departing from the principle of the invention.

I claim:

A dibble for making plant holes comprising a substantially conical tube open at both ends, the smaller end of which tube is cut at an angle oblique to the axis of the tube, and the larger end of which tube is provided with a handle formed integrally with the tube for thrusting the dibble into the soil and withdrawing therewith a core of earth.

In testimony whereof I affix my signature.

HOLGER HANSEN.